(12) United States Patent
Invernizzi et al.

(10) Patent No.: US 11,573,152 B2
(45) Date of Patent: Feb. 7, 2023

(54) OPTICAL TIME DOMAIN REFLECTOMETER (OTDR)-BASED CLASSIFICATION FOR FIBER OPTIC CABLES USING MACHINE LEARNING

(71) Applicant: Cisco Technology, Inc., San Jose, CA (US)

(72) Inventors: Pietro Invernizzi, Varese (IT); Enrico Sozio, Monza (IT)

(73) Assignee: Cisco Technology, Inc., San Jose, CA (US)

( * ) Notice: Subject to any disclaimer, the term of this patent is extended or adjusted under 35 U.S.C. 154(b) by 708 days.

(21) Appl. No.: 16/581,920

(22) Filed: Sep. 25, 2019

(65) Prior Publication Data
US 2021/0089830 A1  Mar. 25, 2021

(51) Int. Cl.
| G01M 11/00 | (2006.01) |
| G06K 9/62 | (2022.01) |
| G06N 3/08 | (2006.01) |
| H04B 10/07 | (2013.01) |
| H04B 10/071 | (2013.01) |

(52) U.S. Cl.
CPC ....... *G01M 11/3145* (2013.01); *G06K 9/6259* (2013.01); *G06K 9/6286* (2013.01); *G06N 3/08* (2013.01); *H04B 10/07* (2013.01); *H04B 10/071* (2013.01)

(58) Field of Classification Search
CPC ............ G01M 11/3145; G02B 6/3873; G06K 9/6259; G06K 9/6286; G06N 3/08; H04B 10/07; H04B 10/071
See application file for complete search history.

(56) References Cited

U.S. PATENT DOCUMENTS

| 10,236,982 B1 | 3/2019 | Zhuge et al. |
| 10,404,362 B1 * | 9/2019 | Xu ..................... H04B 10/0791 |
| 2018/0232574 A1 | 8/2018 | Farsad et al. |
| 2018/0357542 A1 | 12/2018 | Wu et al. |
| 2019/0137355 A1 | 5/2019 | Nakatani et al. |

FOREIGN PATENT DOCUMENTS

CN  101018089 B  8/2010

OTHER PUBLICATIONS

"Analyzing and Managing Results", online: https://www.exfo.com/umbraco/surface/file/download/?ni=16302&cn=en-US&pi=5516#page=159, iOLM Intelligent Optical Link Mapper User Guide, Chapter 14, (2018) pp. 151-182, EXFO, Canada.
"Description of Event Types", online: https://www.exfo.com/umbraco/surface/file/download/?ni=16171&cn=en-US&pi=5327#page=415, FastReporter 2 Post-Processing Software User Guide, (2017) pp. 405-422, EXFO, Canada.

* cited by examiner

*Primary Examiner* — Casey L Kretzer
(74) *Attorney, Agent, or Firm* — Behmke Innovation Group LLC; Kenneth J. Heywood; Jonathon P. Western (57) ABSTRACT

In one embodiment, a device receives optical time domain reflectometer (OTDR) trace samples, each sample labeled with an associated fiber optic cable condition. The device alters the received OTDR trace samples to generate a set of synthetic OTDR trace samples. Each synthetic sample is labeled with the label of the received sample that was altered to generate the synthetic sample. The device trains a machine learning-based classifier using a training dataset that comprises the synthetic OTDR trace samples. The device uses the trained classifier to identify a condition along a particular fiber optic cable based on OTDR trace data obtained from that cable.

20 Claims, 12 Drawing Sheets

OPTICAL TIME DOMAIN REFLECTOMETER (OTDR)-BASED CLASSIFICATION FOR FIBER OPTIC CABLES USING MACHINE LEARNING

TECHNICAL FIELD

The present disclosure relates generally to computer networks, and, more particularly, to optical time domain reflectometer (OTDR)-based classification for fiber optic cables using machine learning.

BACKGROUND

Many data providers use fiber optic cables for high bandwidth transmissions, including telephone signals, Internet communications, and cable television signals. Fiber optics can carry data over very long distances with less interference. An optical signal is created by a transmitter, and the signal is relayed along the cable by repeaters to ensure that the signal does not become distorted or weak. Deployment of fiber cables can also vary considerably, with many long-distance deployments spanning remote and hard to reach locations, such as underground or underwater cables. Breaks in the optical fibers may occur over the long cable spans between repeaters, which can disrupt transmissions and cause significant data loss.

Problems along a fiber optic cable are typically detected through the use of an optical time domain reflectometer (OTDR). In general, an OTDR takes measurements from a fiber optic cable by transmitting optical power pulses into the cable and using a photodiode to capture the reflected signals. The received readings are then translated into trace results representing the attenuation along the cable versus its length. However, the task of interpreting the trace results is often left to a technician, leading to the very real possibility of problems going unnoticed due to human error. This is particularly true in the case of multiple conditions being present in the fiber optic cable.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device receives optical time domain reflectometer (OTDR) trace samples, each sample labeled with an associated fiber optic cable condition. The device alters the received OTDR trace samples to generate a set of synthetic OTDR trace samples. Each synthetic sample is labeled with the label of the received sample that was altered to generate the synthetic sample. The device trains a machine learning-based classifier using a training dataset that comprises the synthetic OTDR trace samples. The device uses the trained classifier to identify a condition along a particular fiber optic cable based on OTDR trace data obtained from that cable.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
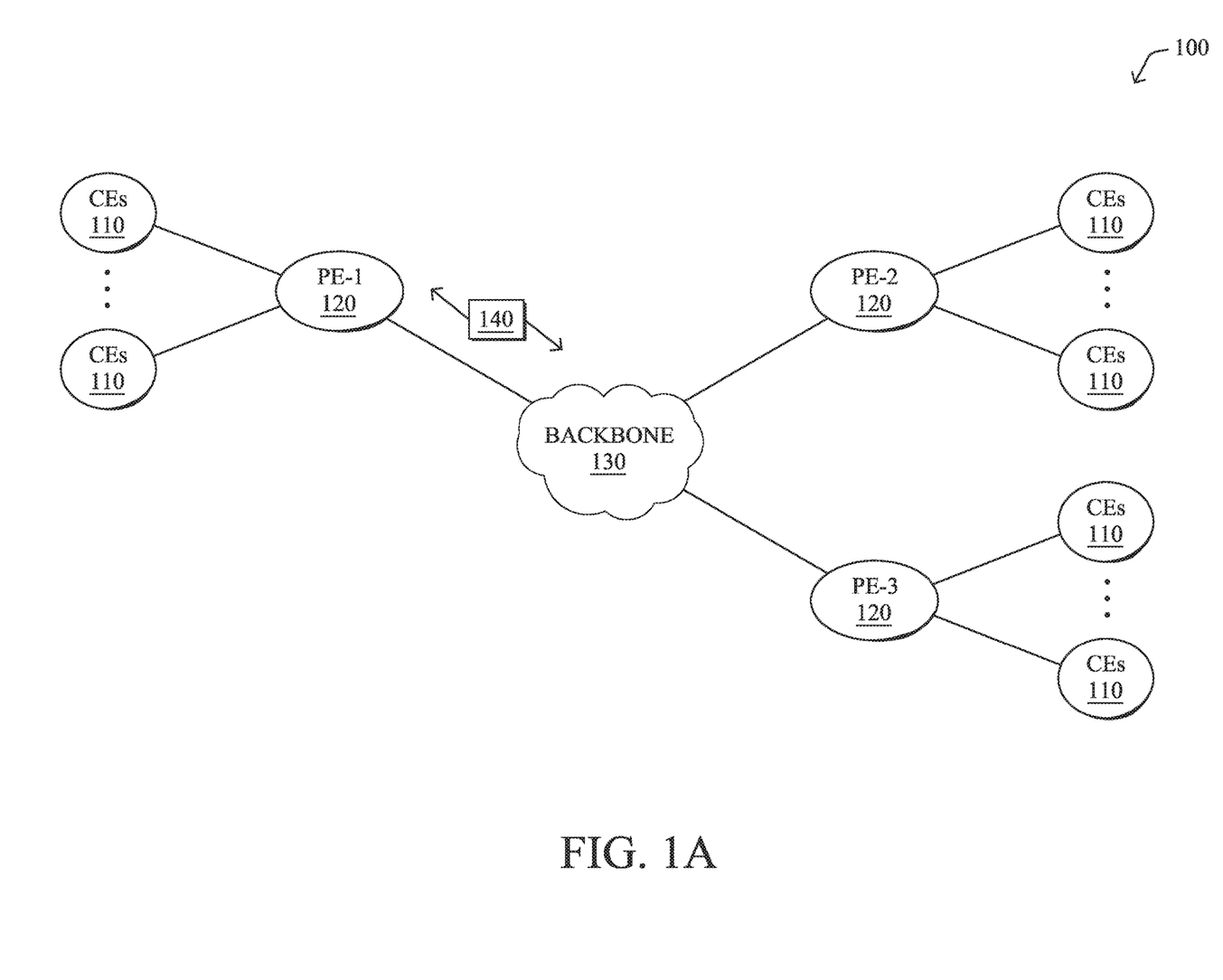
FIGS. 1A-1B illustrate an example computer network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers) via a single CE router, with potentially a backup link (e.g., a 3G/4G/5G/LTE connection). A site of type B may itself be of different types:

2a.) Site Type B 1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
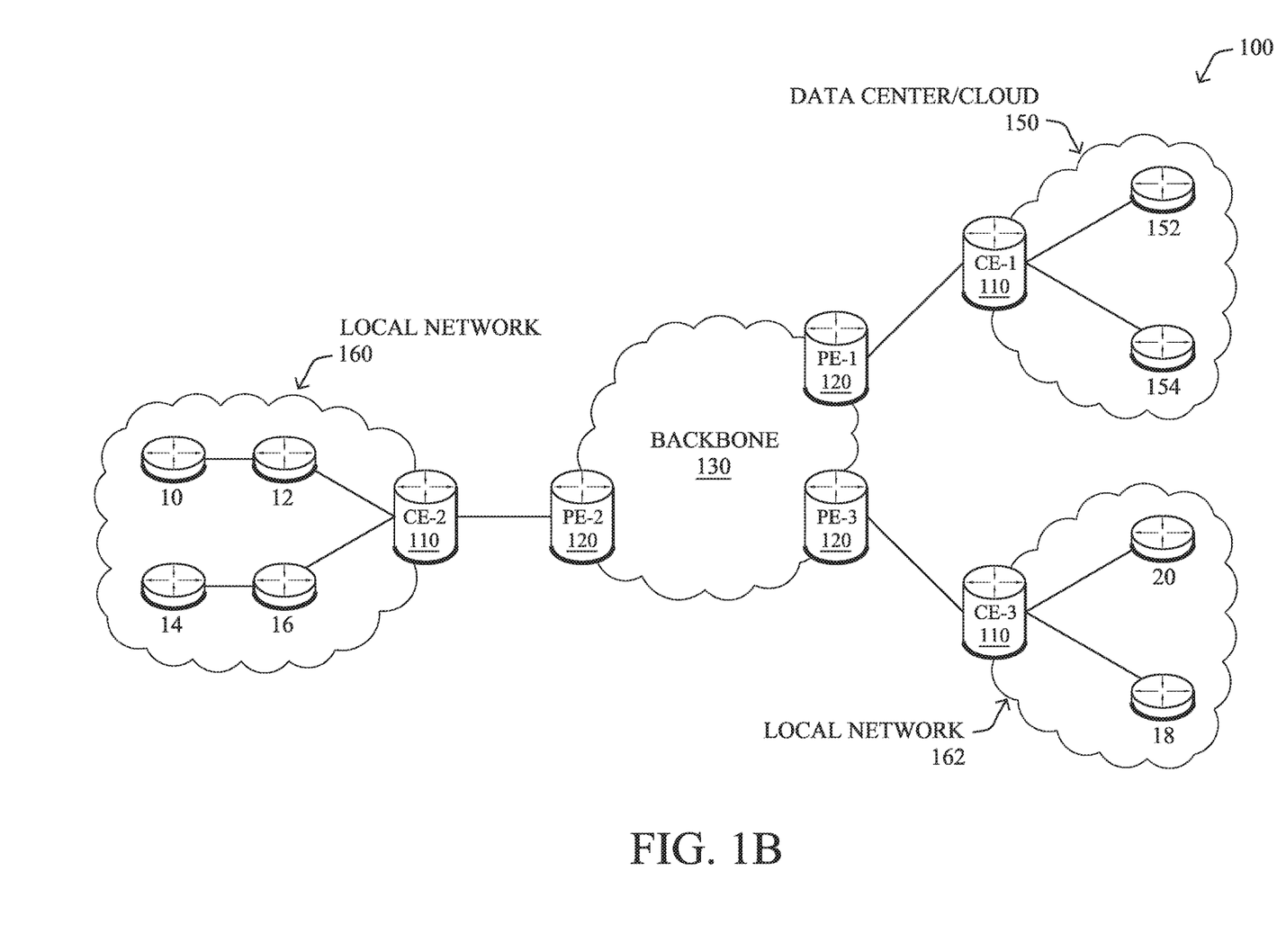

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
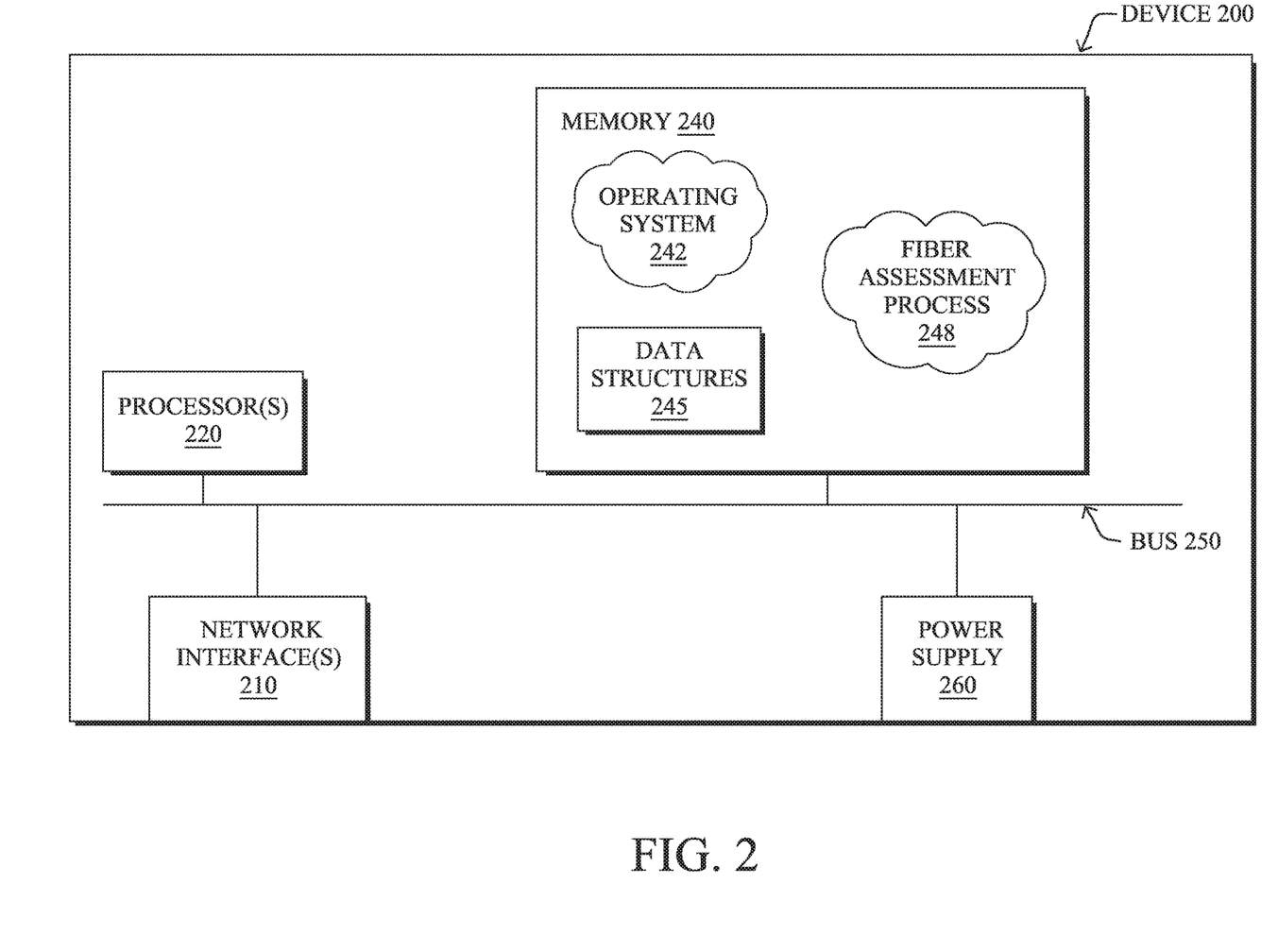
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections (for fog modules 150), and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative fiber assessment process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various embodiments, fiber assessment process 248 may utilize machine learning techniques to identify and classify conditions of a fiber optic cable based on optical time domain reflectometer (OTDR) measurements taken from the cable. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, fiber assessment process 248 may employ one or more supervised, unsupervised, or semi-supervised machine learning models. Generally, supervised learning entails the use of a training set of data, as noted above, that is used to train the model to apply labels to the input data. For example, the training data may include sample OTDR data that has been labeled with the corresponding cable condition (e.g., fiber cut, dirty connector, etc.). On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that fiber assessment process 248 may employ include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) models, artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted a failure. Conversely, the false negatives of the model may refer to the number of times the model predicted normal cable behavior when, in fact, a failure occurred. True negatives and positives may refer to the number of times the model correctly predicted whether the performance of the cable was good or poor, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
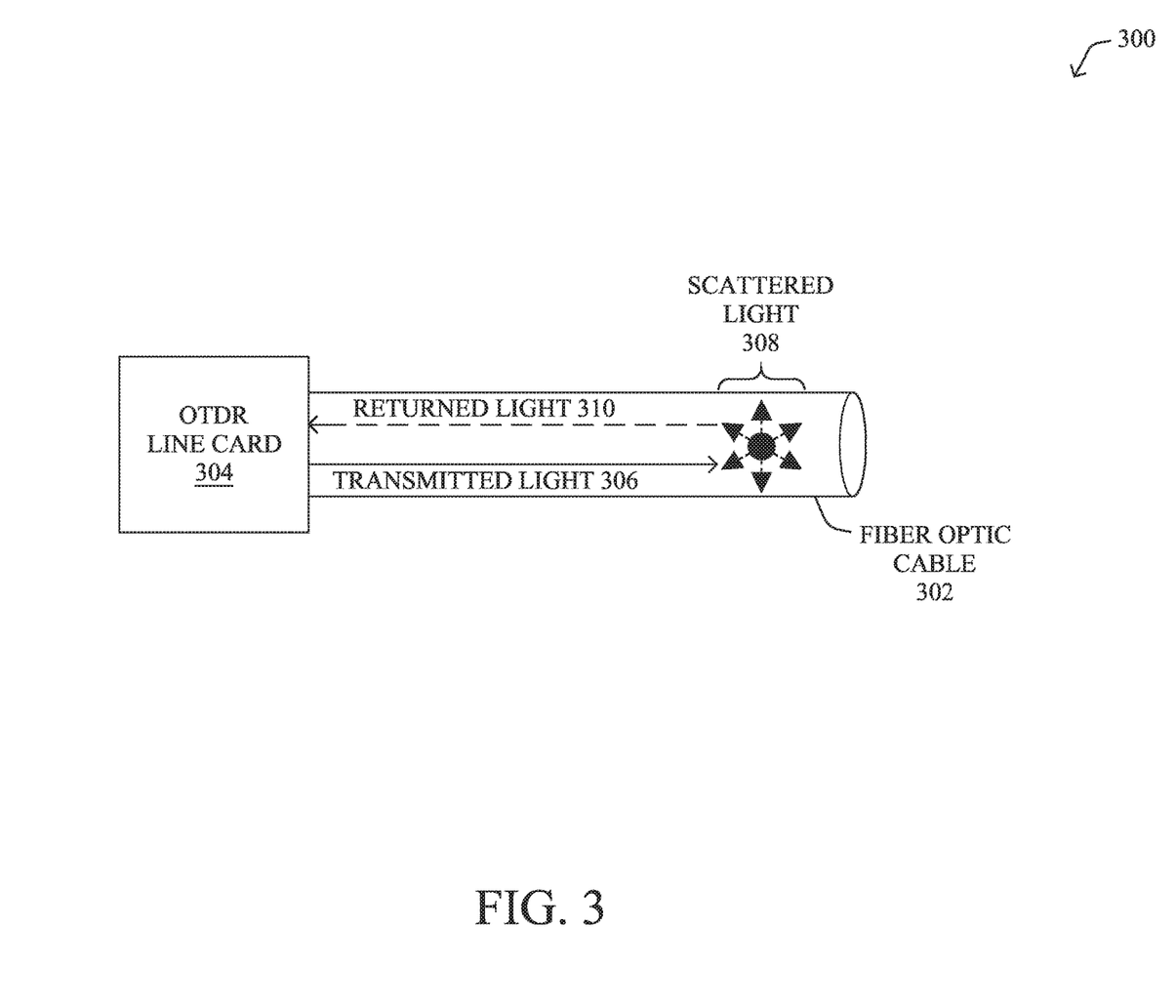
FIG. 3 illustrates an example of an optical time domain reflectometer (OTDR) reading.

As noted above, an optical time domain reflectometer (OTDR) is an instrument typically used to test the integrity of a fiber optic cable. FIG. 3 illustrates an example of an OTDR reading. As shown, a fiber optic cable 302 may be connected to an OTDR, such as OTDR line card 304. For example, OTDR line card 304 may be an NCS1001 NCS1k-

OTDR module from Cisco Systems, Inc. for a wavelength-division multiplexing (DWDM) line system or any other form of OTDR instrument.

To test fiber optic cable 302, OTDR line card 304 may transmit light 306 down the length of fiber optic cable 302. In turn, Rayleigh scattering will cause some of the photons of light 306 to scatter, resulting in scattered light 308 being randomly scattered within fiber optic cable 302. Some of scattered light 308 may reflect backwards towards OTDR line card 304 as part of returned light 310. In addition, returned light 310 may also include a portion of transmitted light 306 that has been reflected off of a polished fiber end or a fault in the fiber. some of A photodiode of OTDR line card 304 then captures the returned light 310.

In general, the amount of returned light 310 in fiber optic cable 302 is mathematically a function of the backscatter characteristics of cable 302, the intensity of transmitted light 306, and the length of the pulse sent by OTDR line card 304. From this, OTDR line card 304, or another processor, may compute an OTDR trace for fiber optic cable 302. Typically, such a trace is represented as a plot of the power loss (in dB) versus the distance along the cable (in km).

Figure 4A:
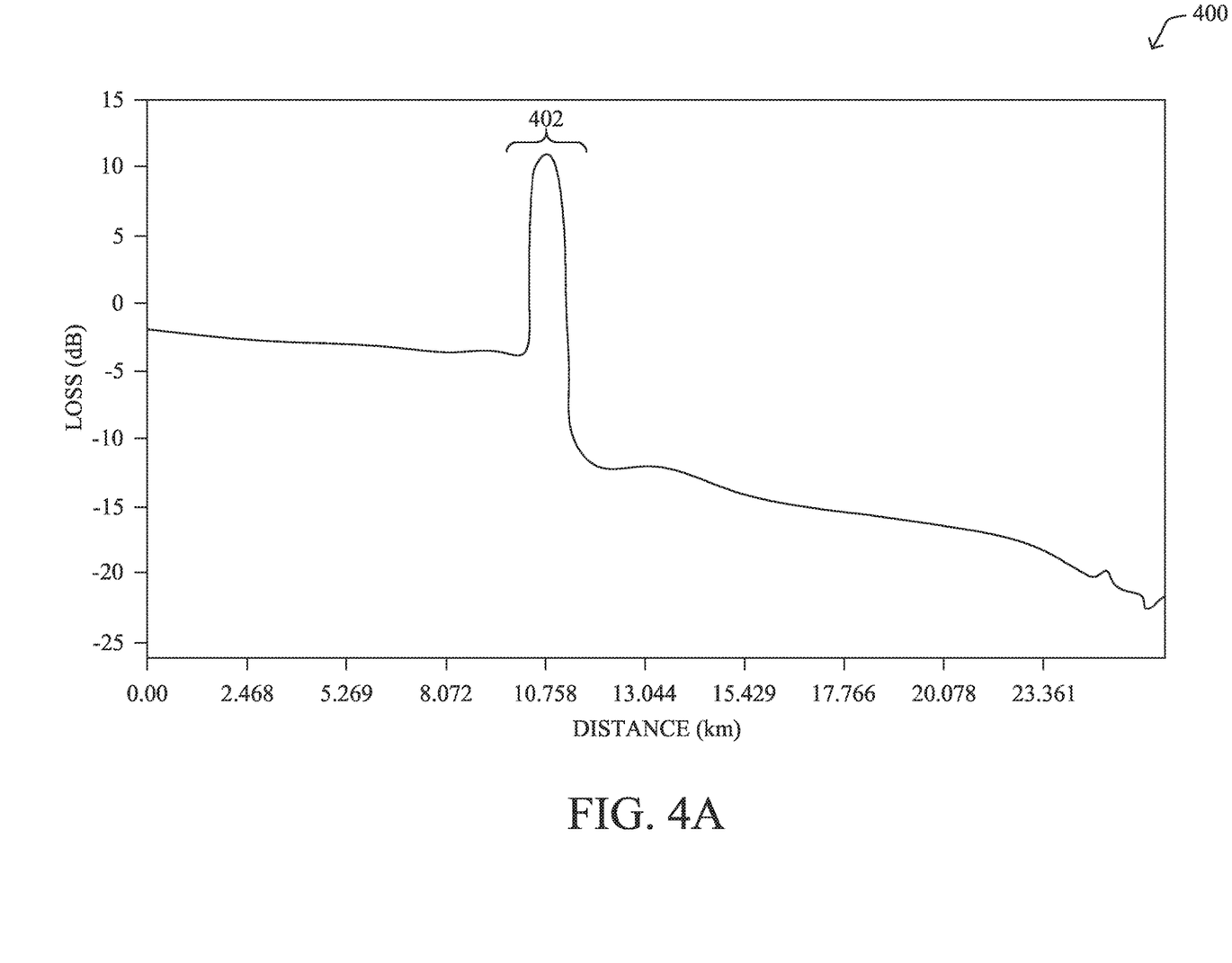
FIGS. 4A-4B illustrate example OTDR traces for fiber optic cables.

FIG. 4A illustrates an example OTDR trace 400, which plots the amount of loss along a fiber optic cable versus its distance. Ideally, an OTDR trace exhibits a straight-line decaying with a constant slope, depending on the dispersion constant of the cable. Typically, the mean loss is in the range of [0.18 db, 0.22 dB] per km. However, when a particular condition/characteristic is present along the cable (e.g., a connector, a bend in the fiber, a cut in the fiber, etc.), the OTDR trace will exhibit non-linear behavior. Such conditions are also sometimes referred to in the field of fiber optics as 'events.' For example, as shown, OTDR trace 400 exhibits a large peak 402 at approximately 10.758 km, indicating a large amount of reflectance at that distance along the cable, followed by an optical loss. Here, the reflectance associated with peak 402 is likely attributable to a cable connector and can be easily identified from trace 400.

Figure 4B:
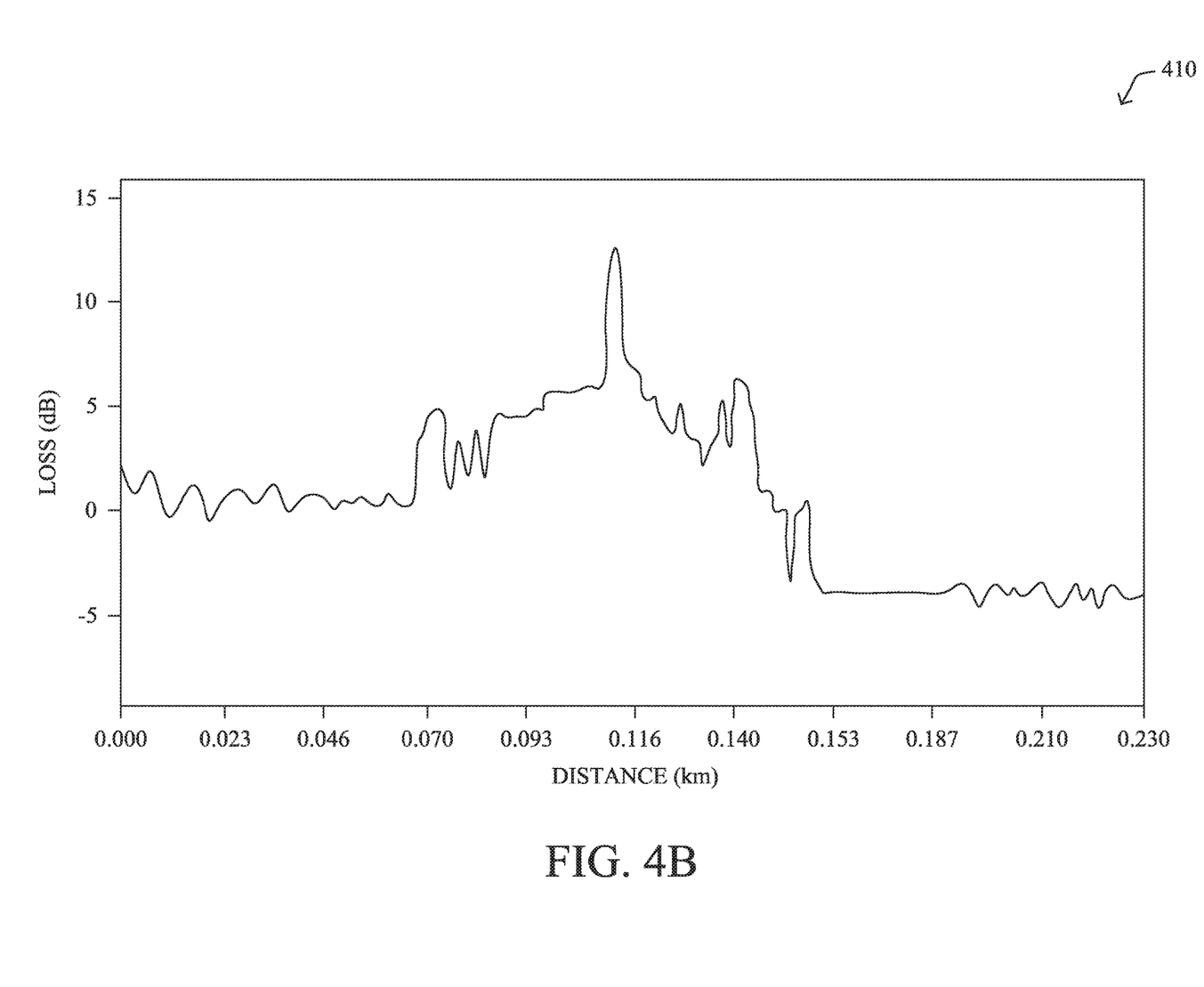

FIG. 4B illustrates another example OTDR trace 410, which also plots the amount of loss along a fiber optic cable versus its distance. In contrast to OTDR trace 400 in FIG. 4A, however, OTDR trace 410 in FIG. 4B exhibits multiple events. The presence of these different events makes interpretation of OTDR trace 410 considerably more difficult, leading to the potential for a technician to misidentify conditions/characteristics of the fiber optic cable. Consequently, problematic conditions along the fiber optic cable can be overlooked, man-hours can be wasted attempting to fix non-existent problems, etc.

Optical Time Domain Reflectometer (OTDR)-Based Classification for Fiber Optic Cables Using Machine Learning The techniques herein introduce a machine learning-based classification approach to interpreting OTDR trace results. In some aspects, samples of OTDR traces can be labeled with their associated fiber optic cable conditions and used to train a machine learning-based classifier. In further aspects, the labeled OTDR traces can also be altered, to generate a synthetic or partially-synthetic training dataset for the classifier. Doing so allows the classifier to identify cable conditions across a wider variety of OTDR traces.

Specifically, according to one or more embodiments of the disclosure as described in detail below, a device receives optical time domain reflectometer (OTDR) trace samples, each sample labeled with an associated fiber optic cable condition. The device alters the received OTDR trace samples to generate a set of synthetic OTDR trace samples. Each synthetic sample is labeled with the label of the received sample that was altered to generate the synthetic sample. The device trains a machine learning-based classifier using a training dataset that comprises the synthetic OTDR trace samples. The device uses the trained classifier to identify a condition along a particular fiber optic cable based on OTDR trace data obtained from that cable.

Illustratively, the techniques described herein may be performed by hardware, software, and/or firmware, such as in accordance with the fiber assessment process 248, which may include computer executable instructions executed by the processor 220 (or independent processor of interfaces 210) to perform functions relating to the techniques described herein.

Figure 5:
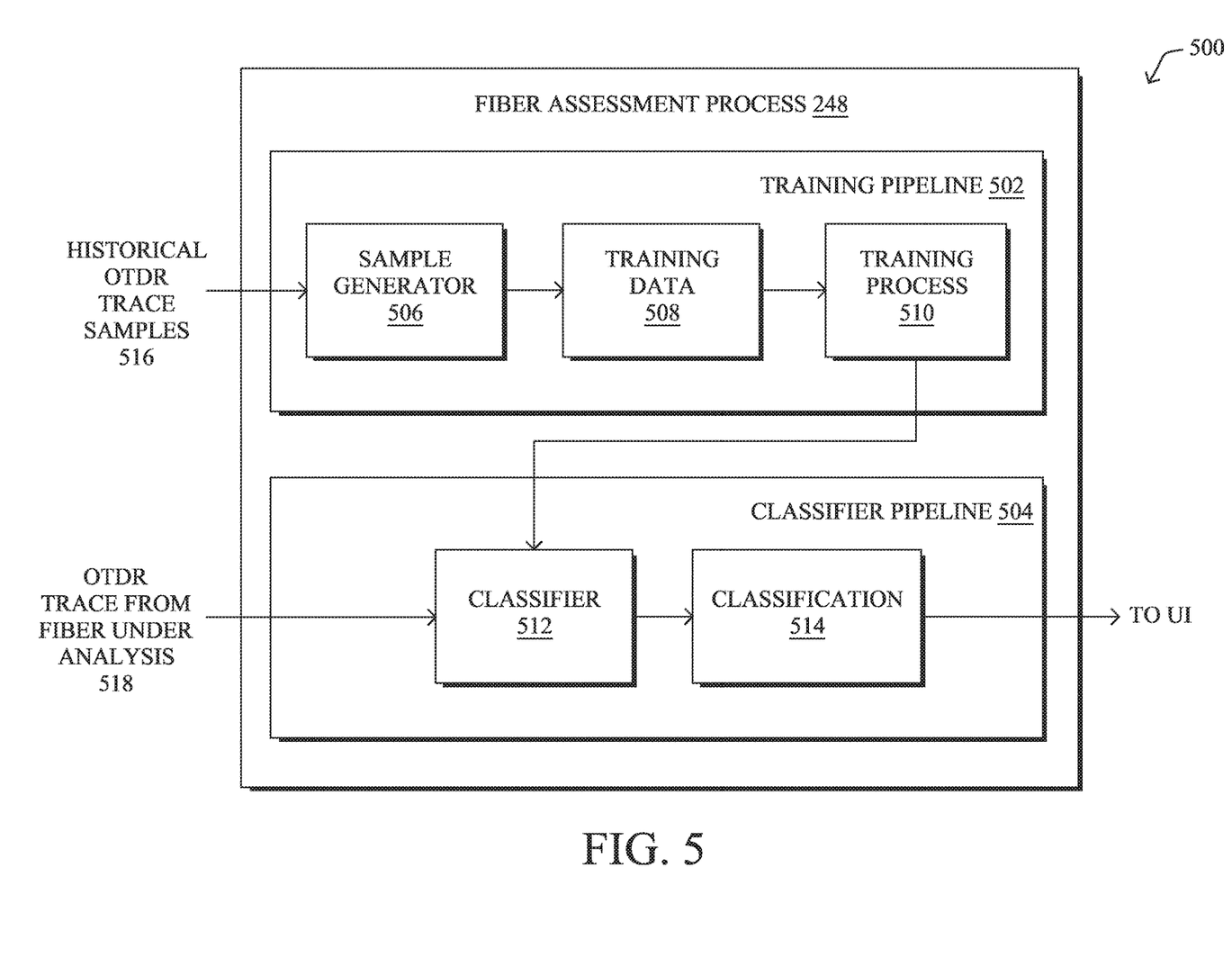
FIG. 5 illustrates an example architecture for classifying conditions of fiber optic cables using machine learning.

Operationally, FIG. 5 illustrates an example architecture 500 for classifying conditions of fiber optic cables using machine learning, according to various embodiments. At the core of architecture 500 is fiber assessment process 248, which may comprise a training pipeline 502 and a classifier pipeline 504. As shown, training pipeline 502 may comprise a sample generator 506, training data 508, and training process 510 configured to train a machine learning-based classifier 512. Similarly, classifier pipeline 504 may utilized the trained classifier 512 to assess OTDR trace 518 from a fiber optic cable under analysis and generate a classifier 514 indicative of the condition(s) along that fiber optic cable.

The components 506-514 may be implemented in a distributed manner or implemented as their own stand-alone services, either as part of the network under observation or as a remote service. For example, classifier pipeline 504 may be implemented on an OTDR device, such as OTDR line card 304, or on another device in communication therewith. Similarly, training pipeline 502 may be implemented on the same device as that of classifier pipeline 504 or, alternatively, on another device in communication therewith. For example, training pipeline 502 may be implemented as a cloud service or on a server that pushes the trained classifier 512 to the device that receives the OTDR trace 518 for analysis.

To train classifier 512, training pipeline 502 may first obtain historical OTDR trace samples 516. In various embodiments, OTDR trace samples 516 may take the form of one or more Standard OTDR Record (SOR) files, raw traces, based on tuple lists (e.g., distance, attenuation, etc.), or any other suitable format, and may also include further information, such as the optical pulse width used to generate the trace. Further information that may be included in OTDR trace samples 516 may be indicative of environmental characteristics of the test, such as raw vs. coarse data, the setting in which the fiber optic cable is located (e.g., an office, a short run, a long run, etc.). This information is very useful to feed and characterize the proper model for classifier 512, to get the best possible high-level events classification.

In various embodiments, OTDR trace samples 516 may also include labels associated with the fiber optic cable condition(s) represented in the OTDR trace. Accordingly, OTDR trace samples 516 may include the entire OTDR traces for the tested fiber optic cables or, in further embodiments, may comprise only portions of the obtained traces that indicate the presence of the fiber optic cable condition (s). These cable conditions may include, but are not limited to, any or all of the following:

Welding

Figure 6A:
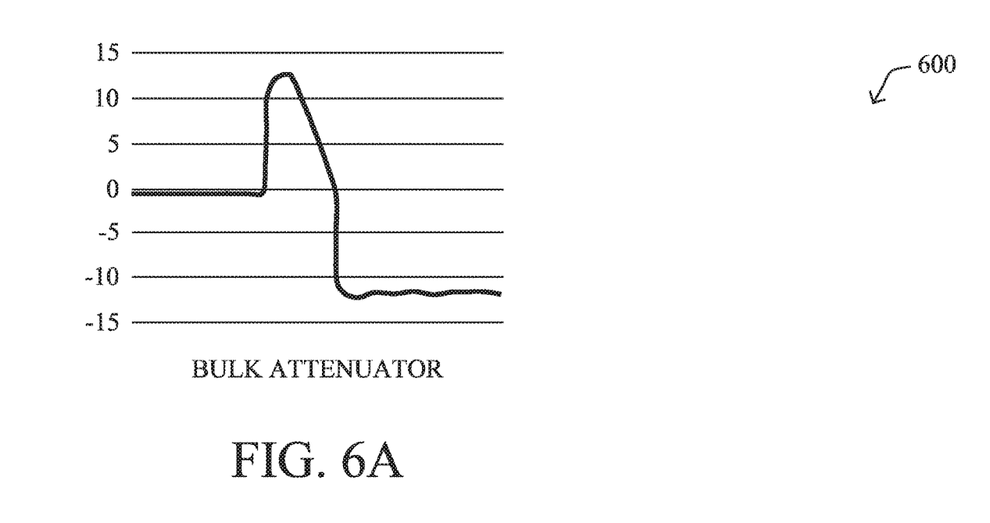
FIGS. 6A-6F illustrate example OTDR trace samples that have been labeled for different cable conditions.
Figure 6B:
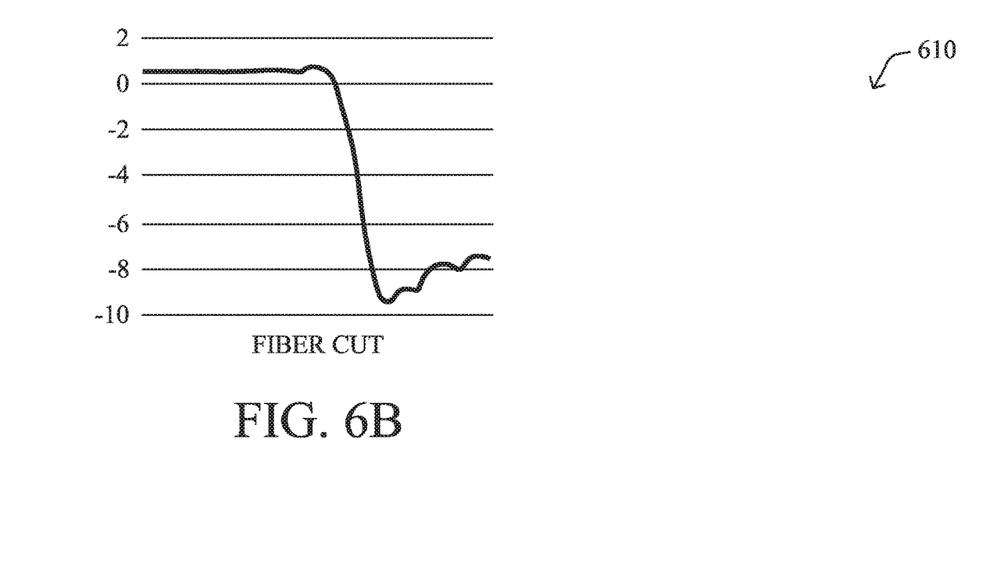
Figure 6C:
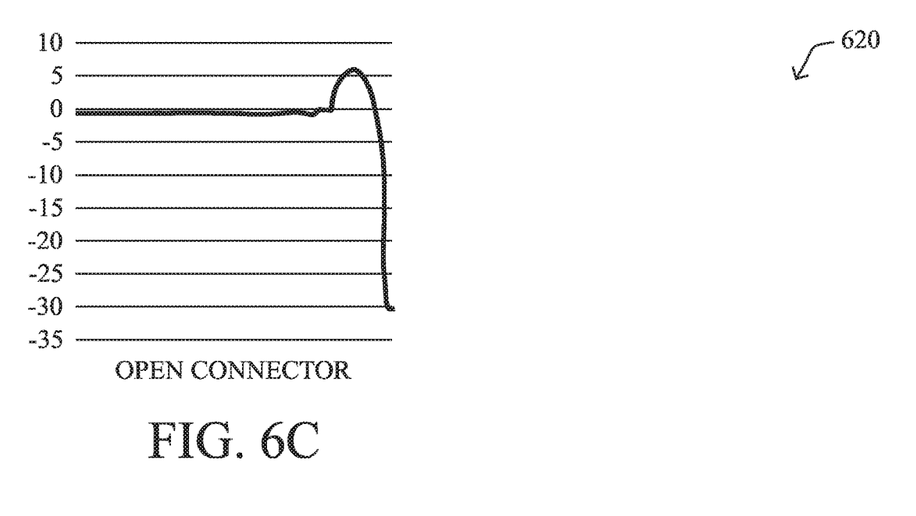
Figure 6D:
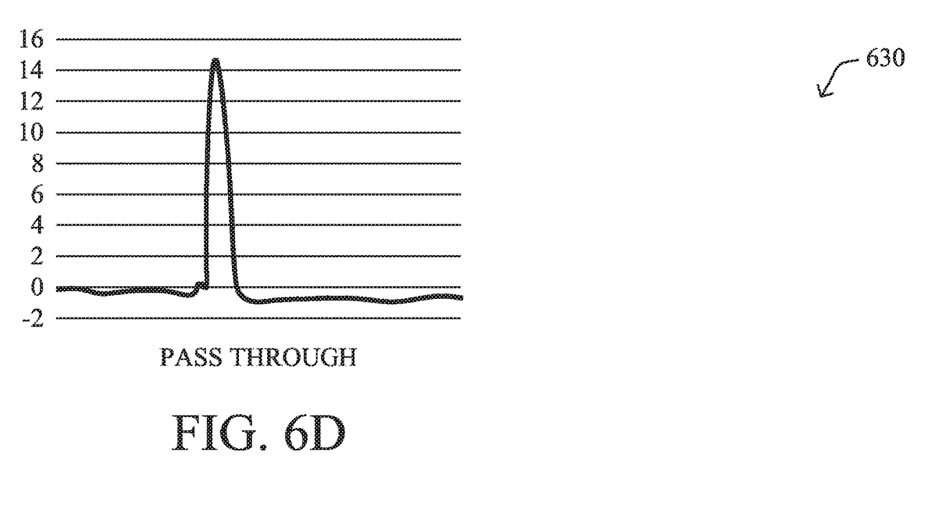
Figure 6E:
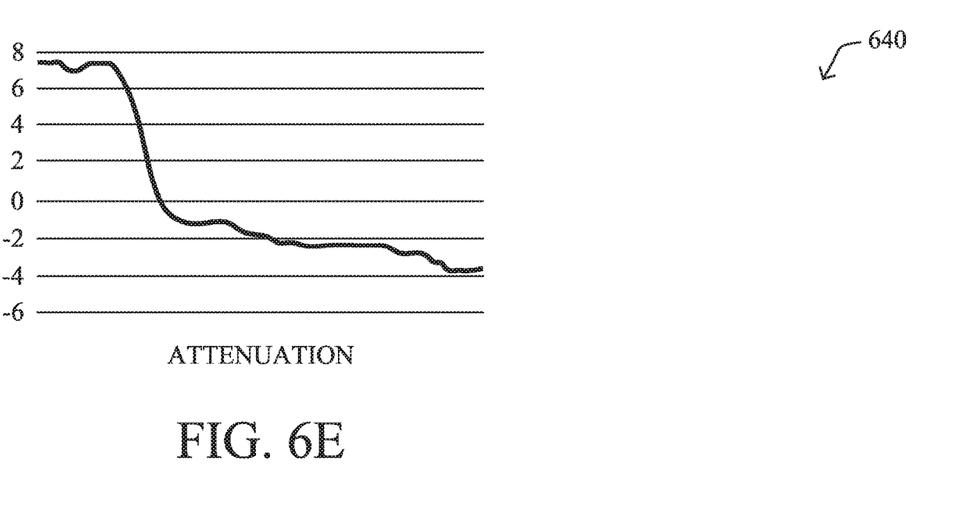
Figure 6F:
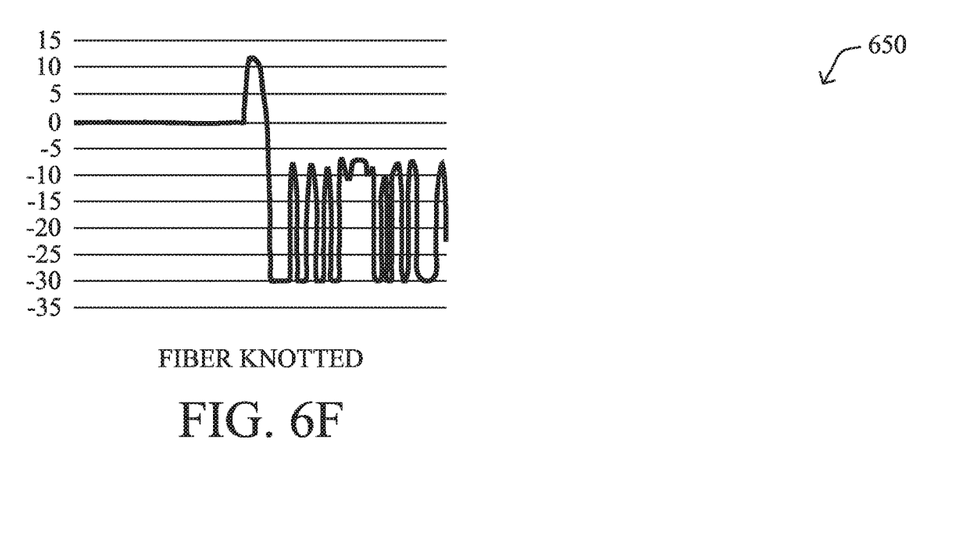

Fiber Cut
Face Plate
Fiber Bend
Pass Through Connector
Open Connector
Dirty Connector
Attenuation
Bulk Attenuation
Knotted Fiber FIGS. 6A-6F illustrate example OTDR trace samples that have been labeled for different cable conditions. As shown, FIG. 6A illustrates an example OTDR trace sample 600 that has been labeled as indicative of a bulk attenuator condition. FIG. 6B illustrates an example OTDR trace sample 610 that has been labeled as indicative of a fiber cut condition. FIG. 6C illustrates an example OTDR trace sample 620 that has been labeled as indicative of an open connector condition. FIG. 6D illustrates an example OTDR trace sample 630 that has been labeled as indicative of a pass through connector condition. FIG. 6E illustrates an example OTDR trace sample 640 that has been labeled as indicative of an attenuation condition. Finally, FIG. 6F illustrates an example OTDR trace sample 650 that has been labeled as indicative of a fiber knotted condition.

Referring again to FIG. 5, as would be appreciated by one skilled in the art, collecting a suitable training dataset of historical OTDR trace samples 516 for each of the different types of cable conditions may be very time and resource intensive. Indeed, many of the cable conditions, such as fiber breaks, are not normally present in deployed fiber optic cables, making OTDR traces indicative of these conditions particularly rare. In some cases, it may be possible to amass a suitable training dataset simply from field samples. In further embodiments, it may also be possible to construct a complete training dataset by creating the cable conditions in a lab or other test environment.

According to various embodiments, training pipeline 502 may include sample generator 506 configured to generate 'synthetic' training data from the received historical OTDR trace samples 516. In contrast to trace samples 516 which were actually observed, the synthetic trace samples generated by sample generator 506 are not actually observed in OTDR readings, but mimic actual readings. To generate the synthetic OTDR trace samples, sample generator 506 may alter the historical OTDR trace samples 516 by performing any or all of the following operations on the trace samples:

Shifting an OTDR trace sample 516 left
Shifting an OTDR trace sample 516 right
Applying a linear decay function to an OTDR trace sample 516
Applying a linear growth function to an OTDR trace sample 516
Compressing an OTDR trace sample 516
Expanding an OTDR trace sample 516

Note also that any transformation by sample generator 506 may also employ various mechanisms, to ensure that any information embedded within a 'real' trace is not lost. For example, shifting a trace too much could shift some parts of the original plot out of the synthetic trace that are needed for the classification. This can be achieved, for example, using an empirical approach or, alternatively, a mathematical evaluation of the original trace, so as to ensure that information is not lost in any resulting synthetic traces.

Figure 7:
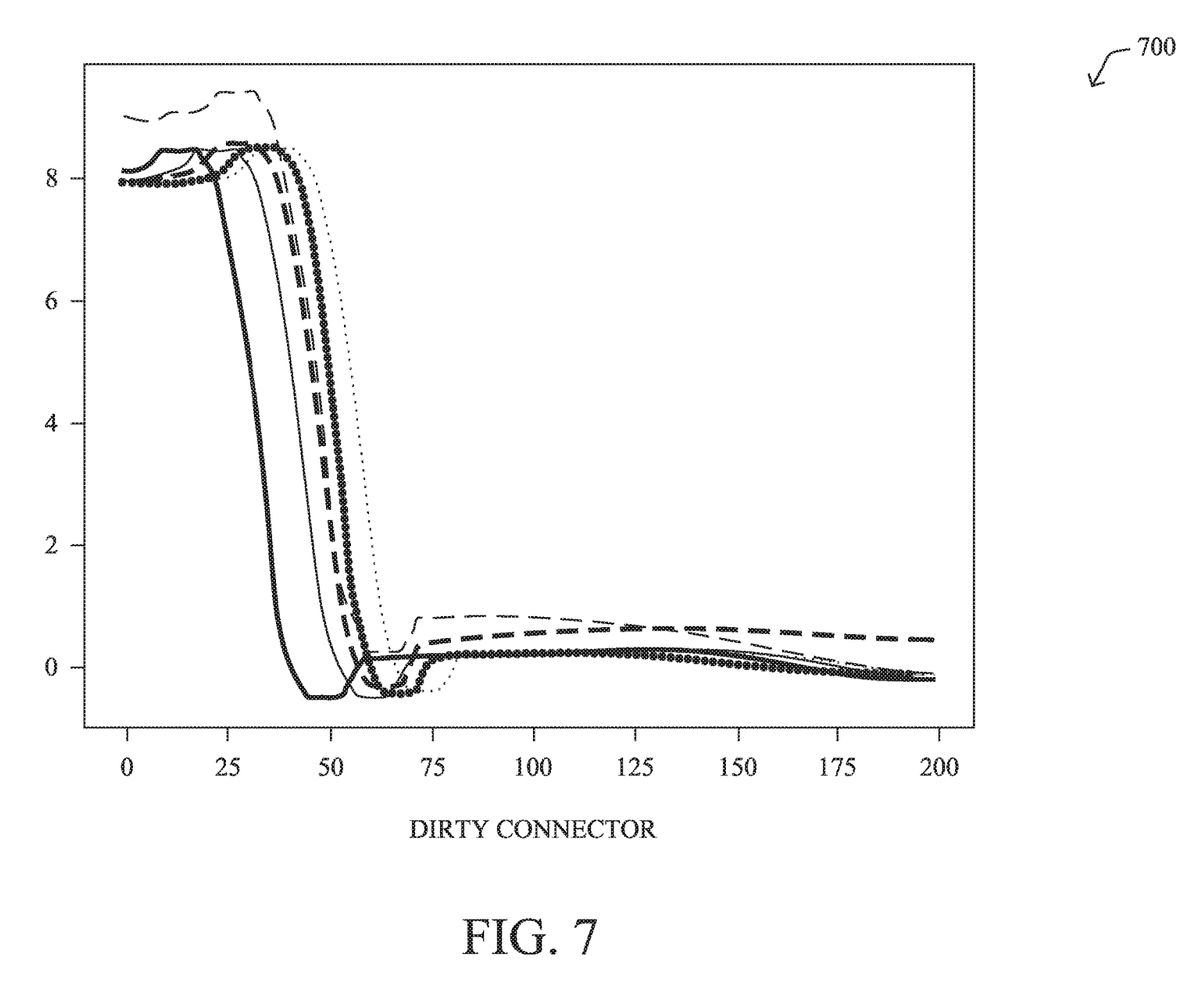
FIG. 7 illustrates an example of the generation of synthetic OTDR trace samples.

For example, FIG. 7 illustrates an example of the generation of synthetic OTDR trace samples. As shown in plot 700, a single OTDR trace sample indicative of a dirty connector event/condition can be altered using any or all of the above operations, to produce additional trace samples that demonstrate similar behaviors as the observed trace sample, but in slightly different ways (e.g., shifted left, shifted right, expanded, etc.). These operations can be repeated any number of times and using different parameters that control the amount of shift, growth, decay, compression, or expansion. In various embodiments, each of the generated OTDR trace samples may also be labeled with the label(s) of source/observed OTDR trace sample from which it was generated. For example, in plot 700, each of the generated trace samples may be labeled as indicative of the presence of a dirty connector cable condition. Such trace samples can be generated by applying a perturbation to the original sample as part of a data augmentation process used to improve the learning mechanism.

Referring again to FIG. 5, training data 508 may comprise the synthetic OTDR trace samples, and their associated labels, that were generated by sample generator 506. In some cases, training data 508 may also include some or all of the trace samples 516 that were actually observed, as well.

Training pipeline 502 may also include training process 510 configured to train classifier 512 using training data 508. In some cases, this may entail training process 510 first dividing training data 508 into samples that are actually used to train classifier 512 and another set of samples used to validate the trained classifier 512. Such an approach can be performed repeatedly, to retrain classifier 512 until it achieves a desired level of performance (e.g., in terms of recall, precision, etc.). In addition, training process 510 may also employ reinforcement learning techniques, to further refine classifier 512.

Classifier 512 may be of any suitable form of machine learning-based classifier. For example, classifier 512 may take the form of a trained neural network, decision tree or random forest-based classifier, a logistic regression or naïve Bayes classifier, an SVM-based classifier, or the like. Further, classifier 512 may be a single class or multi-class classifier, as desired. For example, classifier 512 may take the form of an ensemble classifier that is capable of identifying multiple cable conditions from a single OTDR trace.

During execution, classifier 512 may apply a classification 514 to the OTDR 518 from the fiber optic cable under analysis. In other words, classifier 512 may apply one or more of the cable condition labels from training data 508 on which classifier 512 was trained to the input OTDR trace 518. For example, classifier 512 may assign probabilities to each of the potential cable condition labels and output the label(s) with the highest probabilities as classification 514. In turn, classifier pipeline 504 may send the resulting classification 514 to a user interface, either locally or remotely via a network, for review by a technician.

Preliminary testing of the above approach was used on eighteen real samples of ten different cable conditions/event types to generate 9,500 synthetic trace samples. In turn, these samples were used to train a neural network-based classifier. The neural network had 200 nodes at its ingress layer, thirty nodes in its middle layer, and ten nodes at its output layer. Each of the output nodes was associated with the ten different cable conditions/labels described previously. The trained classifier was then tested against different OTDR traces, to demonstrate its effectiveness. For example, applying the trained classifier to the OTDR trace 410 shown in FIG. 4B yielded the following:

Expected: PASS THROUGH
Prediction PARTIAL: FIBER KNOTTED
Prediction PARTIAL: PASS THROUGH expected: [0. 0. 0. 0. 0. 1.0 0. 0. 0. 0.]
prediction: [0.53 0 0. 0. 0. 0.46 0. 0. 0. 0.]

Thus, the classifier predicted that OTDR trace 410 is most indicative of there being a pass through connector located along the tested fiber optic cable.

Figure 8:
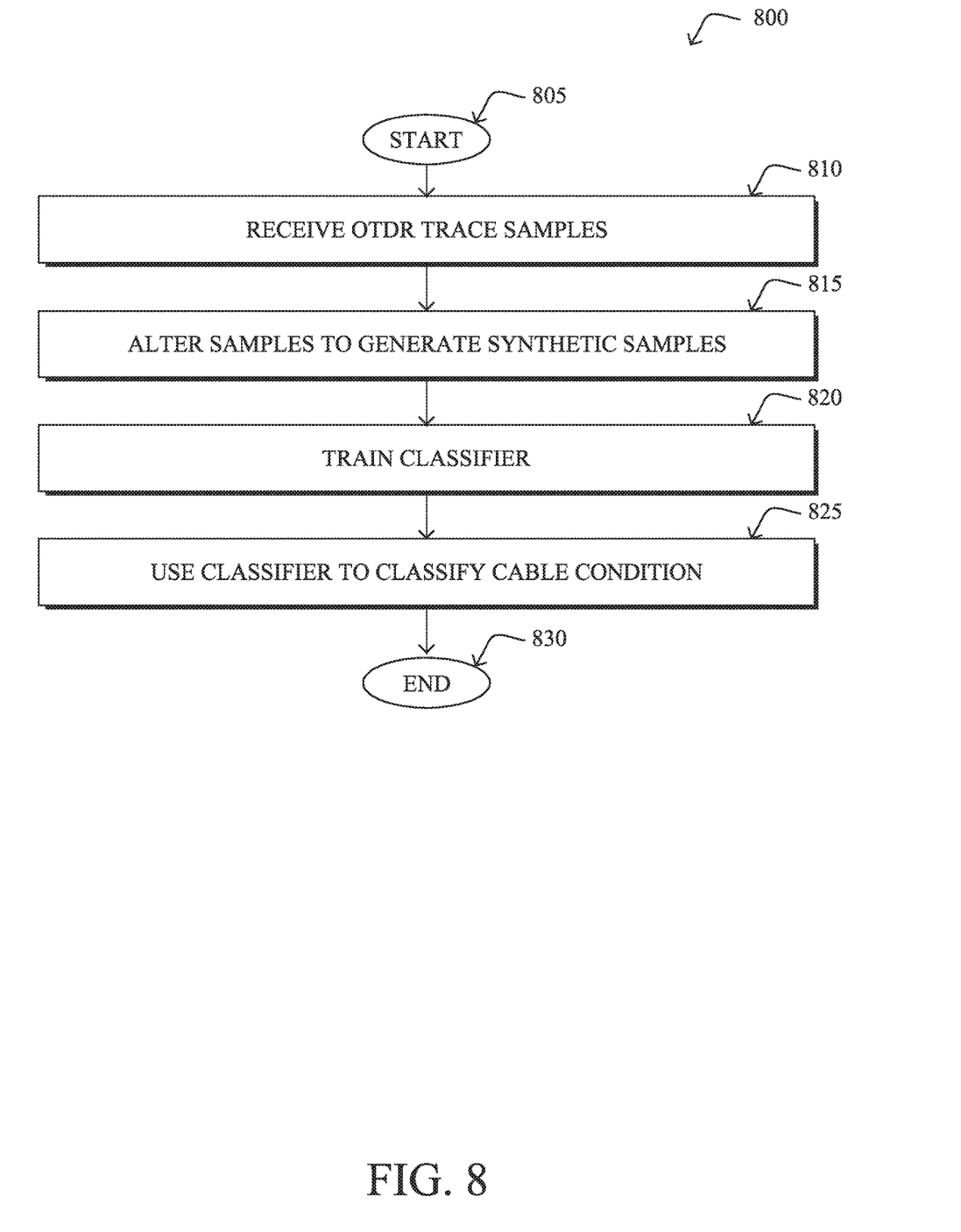
FIG. 8 illustrates a simplified procedure for assessing a fiber optic cable.

FIG. 8 illustrates an example simplified procedure for assessing a fiber cable in accordance with one or more embodiments described herein. For example, a non-generic, specifically configured device (e.g., device 200) may perform procedure 800 by executing stored instructions (e.g., fiber assessment process 248). Procedure 800 may start at step 805, and continues to step 810, where, as described in greater detail above, the device may receive OTDR trace samples. In various embodiments, each of the received samples is labeled with an associated fiber optic cable condition. Such conditions may, in various embodiments, comprise at least one of: a cut fiber, a bent fiber, a knotted fiber, welding, a face plate, attenuation, a bulk attenuator, an open connector, a dirty connector, or a pass through connector located along the length of the fiber optic cable. Such labels may be applied, for example, by an expert user via a user interface or received from a trusted third party.

At step 815, as detailed above, the device may alter the received OTDR trace samples to generate a set of synthetic OTDR trace samples. In other words, the device may generate new OTDR trace samples that were not actually observed from a fiber optic cable from those trace samples that were. In some embodiments, this may entail the device performing one or more of the following: shifting an OTDR trace sample, applying a linear decay or growth function to the OTDR trace sample, compressing an OTDR trace sample, or expanding an OTDR trace sample. In various embodiments, the device may also label each of the synthetic samples with the label of the received sample that was altered to generate the synthetic sample. For example, if a synthetic OTDR trace sample was generated by compressing an OTDR trace sample labeled as indicative of a fiber cut, the device may also apply this label to the compressed, synthetic trace sample.

At step 820, the device may train a machine learning-based classifier using a training dataset that comprises the synthetic OTDR trace samples, as described in greater detail above. In some embodiments, the classifier may be trained to assign a probability to each of a set of fiber optic cable condition labels that were used to label the received OTDR trace samples. In a further embodiment, the trained classifier may comprise a neural network. In another embodiment, the classifier may be a multi-class classifier trained to identify multiple conditions concurrently present in a fiber optic cable (e.g., there is a pass through connector and then a fiber cut, etc.).

At step 825, as detailed above, the device may use the trained classifier to identify a condition along a particular fiber optic cable based on OTDR trace data obtained from that cable. In some cases, the device may take the OTDR reading from the cable itself or receive the OTDR trace data from another device. In further embodiments, the device may do so by deploying the trained classifier to a device connected to the particular fiber optic cable or to a device in communication with the OTDR that took the measurement. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the automatic detection of different fiber optic cable conditions by using a machine learning-based classifier on OTDR trace data obtained from a fiber optic cable. In doing so, the cable conditions can be identified without the potential for human error and in a faster manner than relying on a technician to interpret the results. This automation also allows for the system to automatically initiate corrective measures, such as generating alerts, dispatching a technician for repairs, and the like.

While there have been shown and described illustrative embodiments that provide for OTDR-based classification of fiber optic cable conditions, it is to be understood that various other adaptations and modifications may be made within the spirit and scope of the embodiments herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a device, optical time domain reflectometer (OTDR) trace samples, each sample labeled with an associated fiber optic cable condition;
   altering, by the device, the received OTDR trace samples to generate a set of synthetic OTDR trace samples, wherein each synthetic sample is labeled with the label of the received sample that was altered to generate the synthetic sample;
   training, by the device, a machine learning-based classifier using a training dataset that comprises the synthetic OTDR trace samples; and
   using, by the device, the trained classifier to identify a condition along a particular fiber optic cable based on OTDR trace data obtained from that cable.

2. The method as in claim 1, wherein each of the received OTDR trace samples is labeled with an associated fiber optic cable condition comprising at least one of: cut fiber, bent fiber, or knotted fiber.

3. The method as in claim 1, wherein using the trained classifier to identify a condition along the particular fiber optic cable comprises:
   deploying the trained classifier to a device connected to the particular fiber optic cable.

4. The method as in claim 1, wherein the machine learning-based classifier comprises a neural network.

5. The method as in claim 1, wherein altering the received OTDR trace samples to generate a set of synthetic OTDR trace samples comprises at least one of: shifting an OTDR trace sample, applying a linear decay or growth function to the OTDR trace sample, compressing an OTDR trace sample, or expanding an OTDR trace sample.

6. The method as in claim 1, wherein the classifier is trained to assign a probability to each of a set of fiber optic cable condition labels that were used to label the received OTDR trace samples.

7. The method as in claim 1, wherein each of the received OTDR trace samples is labeled with an associated fiber optic cable condition comprising at least one of: an open connector, a dirty connector, or a pass through connector.

8. The method as in claim 1, wherein the classifier is trained to identify multiple conditions concurrently present in a fiber optic cable.

9. The method as in claim 1, wherein each of the OTDR trace samples is labeled with an associated fiber optic cable condition comprising at least one of: welding, a face plate, attenuation, or a bulk attenuator.

10. An apparatus, comprising:
one or more network interfaces;
a processor coupled to the network interfaces and configured to execute one or more processes; and
a memory configured to store a process executable by the processor, the process when executed configured to:
receive optical time domain reflectometer (OTDR) trace samples, each sample labeled with an associated fiber optic cable condition;
alter the received OTDR trace samples to generate a set of synthetic OTDR trace samples, wherein each synthetic sample is labeled with the label of the received sample that was altered to generate the synthetic sample;
train a machine learning-based classifier using a training dataset that comprises the synthetic OTDR trace samples; and
use the trained classifier to identify a condition along a particular fiber optic cable based on OTDR trace data obtained from that cable.

11. The apparatus as in claim 10, wherein each of the received OTDR trace samples is labeled with an associated fiber optic cable condition comprising at least one of: cut fiber, bent fiber, or knotted fiber.

12. The apparatus as in claim 10, wherein the apparatus uses the trained classifier to identify a condition along the particular fiber optic cable by:
deploying the trained classifier to a device connected to the particular fiber optic cable.

13. The apparatus as in claim 10, wherein the machine learning-based classifier comprises a neural network.

14. The apparatus as in claim 10, wherein altering the received OTDR trace samples to generate a set of synthetic OTDR trace samples comprises at least one of: shifting an OTDR trace sample, applying a linear decay or growth function to the OTDR trace sample, compressing an OTDR trace sample, or expanding an OTDR trace sample.

15. The apparatus as in claim 10, wherein the classifier is trained to assign a probability to each of a set of fiber optic cable condition labels that were used to label the received OTDR trace samples.

16. The apparatus as in claim 10, wherein each of the received OTDR trace samples is labeled with an associated fiber optic cable condition comprising at least one of: an open connector, a dirty connector, or a pass through connector.

17. The apparatus as in claim 10, wherein the classifier is trained to identify multiple conditions concurrently present in a fiber optic cable.

18. The apparatus as in claim 10, wherein each of the OTDR trace samples is labeled with an associated fiber optic cable condition comprising at least one of: welding, a face plate, attenuation, or a bulk attenuator.

19. A tangible, non-transitory, computer-readable medium storing program instructions that cause a device to execute a process comprising:
receiving, at the device, optical time domain reflectometer (OTDR) trace samples, each sample labeled with an associated fiber optic cable condition;
altering, by the device, the received OTDR trace samples to generate a set of synthetic OTDR trace samples, wherein each synthetic sample is labeled with the label of the received sample that was altered to generate the synthetic sample;
training, by the device, a machine learning-based classifier using a training dataset that comprises the synthetic OTDR trace samples; and
using, by the device, the trained classifier to identify a condition along a particular fiber optic cable based on OTDR trace data obtained from that cable.

20. The computer-readable medium as in claim 19, wherein altering the received OTDR trace samples to generate a set of synthetic OTDR trace samples comprises at least one of: shifting an OTDR trace sample, applying a linear decay or growth function to the OTDR trace sample, compressing an OTDR trace sample, or expanding an OTDR trace sample.

* * * * *